United States Patent
Lang et al.

(10) Patent No.: US 12,129,108 B2
(45) Date of Patent: Oct. 29, 2024

(54) VENT

(71) Applicant: TRANS OCEAN BULK LOGISTICS LIMITED, Southampton (GB)

(72) Inventors: Andrew Lang, Southampton (GB); Xuefeng Wu, Hove (GB)

(73) Assignee: TRANS OCEAN BULK LOGISTICS LIMITED, Southampton (GB)

( * ) Notice: Subject to any disclaimer, the term of this patent is extended or adjusted under 35 U.S.C. 154(b) by 461 days.

(21) Appl. No.: 17/055,007

(22) PCT Filed: Jun. 6, 2019

(86) PCT No.: PCT/GB2019/051573
§ 371 (c)(1),
(2) Date: Jun. 16, 2021

(87) PCT Pub. No.: WO2019/234434
PCT Pub. Date: Dec. 12, 2019

(65) Prior Publication Data
US 2022/0063904 A1    Mar. 3, 2022

(30) Foreign Application Priority Data

Jun. 7, 2018    (GB) .................... 1809401.1

(51) Int. Cl.
*B65D 90/34*     (2006.01)
*B65D 88/16*     (2006.01)
(Continued)

(52) U.S. Cl.
CPC ......... *B65D 90/34* (2013.01); *B65D 88/1606* (2013.01); *B65D 88/22* (2013.01);
(Continued)

(58) Field of Classification Search
CPC .... B65D 51/1644; B65D 51/16; B65D 90/34; F16K 15/148; F16K 24/04; Y10T 137/3084; Y10T 137/309
(Continued)

(56) References Cited

U.S. PATENT DOCUMENTS 630,315 A  *  8/1899  Barclay ................. F16K 47/08
                                                138/42
3,411,532 A    12/1968  Sully
(Continued)

FOREIGN PATENT DOCUMENTS

BE          465078 A      5/1946
CN       207261760 U      4/2018
(Continued)

OTHER PUBLICATIONS

International Search Report and Written Opinion for International Application No. PCT/GB2019/051573 dated Jul. 22, 2019, 12 pages.
(Continued)

*Primary Examiner* — Kevin F Murphy
(74) *Attorney, Agent, or Firm* — Husch Blackwell LLP

(57) ABSTRACT

A vent is described, more specifically a vent for the egress of fluid. The vent comprises a housing comprising an opening and at least one valve that extends through the housing. Additionally, the vent includes a plurality of baffles within the housing, where each baffle in the plurality of baffles comprises at least one aperture, and wherein the aperture or apertures of a first baffle within the plurality of baffles are offset from the aperture or apertures of a second baffle within the plurality of baffles. In this way, the egress of various fluids though the housing may be controlled.

18 Claims, 6 Drawing Sheets

(51) Int. Cl.
*B65D 88/22* (2006.01)
*F16K 15/14* (2006.01)
*F16K 24/04* (2006.01)

(52) U.S. Cl.
CPC .... *B65D 2205/00* (2013.01); *B65D 2590/043* (2013.01); *F16K 15/148* (2013.01); *F16K 24/04* (2013.01)

(58) Field of Classification Search
USPC ........................................................ 220/374
See application file for complete search history.

(56) References Cited

U.S. PATENT DOCUMENTS

| | | | | |
|---|---|---|---|---|
| 3,422,982 | A * | 1/1969 | Myers | .................... F16H 57/027 |
| | | | | 220/374 |
| 3,812,879 | A | 5/1974 | Terrell | |
| 4,938,247 | A | 7/1990 | Yandle, II | |
| 5,584,409 | A * | 12/1996 | Chemberlen | ........ B65D 77/225 |
| | | | | 220/373 |
| 7,685,793 | B2 * | 3/2010 | Newrones | ............. F16K 15/144 |
| | | | | 383/44 |
| 8,128,385 | B2 * | 3/2012 | Takemi | ............... F04B 39/1013 |
| | | | | 137/856 |
| 8,893,744 | B2 * | 11/2014 | Sigmund | ............... F16H 57/027 |
| | | | | 137/493 |
| 9,802,805 | B2 * | 10/2017 | Singh | .................... B67D 3/0038 |
| 10,480,668 | B2 * | 11/2019 | Baxter | .................. B60P 3/2235 |
| 2013/0153579 | A1 | 6/2013 | Pashcow | |

FOREIGN PATENT DOCUMENTS

| | | |
|---|---|---|
| FR | 2715141 A1 | 7/1995 |
| GB | 919774 A | 2/1963 |

OTHER PUBLICATIONS

European Examination Report Issued for Great Britain Application No. 1809401.1, dated Nov. 30, 2021, 3 pages.

* cited by examiner

VENT

FIELD OF THE INVENTION

The present invention relates to a vent, more specifically to a vent for the egress of gas, and more specifically still to a vent for the egress of gas that inhibits the egress of fluid.

BACKGROUND TO THE INVENTION

The use of tanks to transport fluids is well known. Increasingly, tanks with flexible components located inside transportation containers, which are commonly known as flexitanks, are used. Tanks of this nature change in volume with the volume of their contents. Typically, the tanks are shaped and filled with fluid such that they fill the majority of their transportation container, which helps to ensure space and cost-effective transportation. A wide range of transportation containers can be used to contain these types of tanks including, but not limited to, intermodal, International Organisation for Standardization (ISO), cargo, freight, rail or shipping containers.

However, whilst the use of tanks with flexible components has many benefits, there are some challenges with the technology in its current form.

Tanks of this kind are normally impermeable and airtight. This prevents leaks, contamination from the environment and oxidation of the held fluid. However, tanks with flexible components have been known to stretch, expand and even structurally fail when the pressure inside the tank has increased during transportation. This can be problematic as the expanded tank may damage or bow the sides of the transportation container, which in turn can damage or negatively impact the surroundings. Complete tank failure and the discharge of tank contents into the wider environment is not unheard of.

Pressure can build-up inside the tank for a variety of reasons, such as, but not limited to, changes in air temperature and pressure, previously dissolved gases being released from the held fluid or the held fluid producing additional gases once inside the tank. One type of unwanted and excess gas is the production of fermentation gases from food-stuffs. For example, wine and fruit juice and their concentrates are known to undergo a secondary fermentation process during which they release considerable volumes of secondary fermentation gases such as carbon dioxide and methane.

Attempts to overcome the problem of pressure build up in tanks, and specifically flexible tanks, have been made via the use of vents. Here, vents are used to prevent the potentially damaging build-up of gases by off-gassing and relieving pressure inside the tank. Off-gassing results in the vent discharging a portion of the gaseous content of the tank.

However, whilst the use of vents to egress excess pressure from within flexible tanks has been beneficial, challenges remain with the technology in its present form. In vents of the state of the art, a portion of the commercially transported fluid may frequently be egressed from the tank alongside any unwanted waste gases in a venting event. Additionally, the vent itself may become clogged if part of the commercially transported fluid is egressed. This may be problematic for two reasons; firstly, potentially preventing any future venting occurring and increasing the risk of a bursting event and, secondly, potentially preventing the vent from closing leading to the complete loss or spoilage of the transported fluid.

Objects and aspects of the present claimed invention seek to address at least these problems of the prior art.

SUMMARY OF THE INVENTION

According to a first aspect of the present invention, there is provided a vent for the egress of fluid, wherein said vent comprises a housing, said housing comprising an opening and at least one valve that extends through the housing, and a plurality of baffles within the housing, wherein each baffle in the plurality of baffles comprises at least one aperture, and wherein the aperture or apertures of a first baffle within the plurality of baffles are offset from the aperture or apertures of a second baffle within the plurality of baffles.

The vent is arranged to be installed in the wall of a flexible tank. The vent itself ensures that fluid can be egressed from the contents of the tank into the environment. This egress is advantageous as it can prevent the build-up of gases and pressure inside the flexible tank. A build-up of gases is undesirable as the pressure build-up can cause the tank to deform, expand and swell, which not only possess a risk to the fluid contents of the tank but also the transportation container. Additionally, the baffled structure of the vent prevents the transported fluid form coming into contact with the valve, preventing its potential clogging or blockage.

The valve of the vent extends through the housing of the vent. Preferably, the valve extends through the walls, surface or shell of the housing such that the valve provides a route of fluid communication between the interior and the exterior of the housing.

The apertures of the baffles are offset from one another. The apertures should be positioned such that they do not form a continuous straight channel. Preferably, the apertures are offset due to translational or rotational movement of one baffle with respect to another. Preferably, the apertures are completely offset. Preferably, the offset ensures that the majority of the area of an aperture does not overlap with and is obscured by an adjacent baffle. More preferably, the total area of an aperture does not overlap with and is obscured by an adjacent baffle. In other words, the aperture is eclipsed by an adjacent baffle, either totally or partially Preferably, each baffle in the plurality of baffles is arranged such that their aperture or apertures are offset with the aperture or apertures of the adjacent baffles. Preferably, the plurality of baffles comprises a series of baffles. Preferably, the series of baffles is linear.

Preferably, at least one aperture in a baffle is completely obscured by an adjacent baffle. Preferably, each baffle in the plurality of baffles is positioned such that its aperture is completely obscured by an adjacent baffle. Preferably, the all the apertures of a baffle are completely obscured and offset from the all the apertures of adjacent baffles.

Preferably, the apertures are positioned to define a convoluted pathway. The convoluted pathway describes a pathway or route which is 'torturous' or 'cryptic'. When a convoluted pathway is traversed it requires multiple changes in the directional vector at different points along its pathway and, as such, the distance between two points along the convoluted pathway is greater than the straight line distance between the points. Preferably, the or each valve is exclusively accessible to the contents of the flexible tank via the convoluted pathway.

Preferably, said apertures are rotationally offset. Preferably, the convoluted pathway comprises baffles that comprise apertures that are rotationally off-set. Preferably, said apertures are translationally offset. Preferably, the convoluted pathway comprises baffles that comprise apertures that are translationally off-set.

Preferably, the apertures define a pathway through said housing to said at least one valve. Preferably, said valve is a one-way valve. Preferably, there is a plurality of valves. Preferably, the valves are located at the extremities of the housing. Preferably, the internal portion of the valve is only accessible to a fluid after said fluid traverses the convoluted pathway.

Preferably, said baffles are substantially planar. Preferably, at least two baffles in said plurality of baffles are substantially parallel. Preferably, each baffle in the plurality of baffles defines a plane and all of the defined planes are parallel. Preferably, the parallel planes occupied by the baffles are parallel to the plane occupied by the opening of the vent.

Preferably, at least one baffle comprises at least one locating member for positioning said baffle relative to an adjacent baffle. Preferably, said adjacent baffle comprises at least one retaining member for receiving and retaining said locating member. Preferably, the retaining and locating members are complementary. Preferably, the baffles in the series of baffles are attached together using the locating and retaining members.

Preferably, said at least one valve is a one-way valve oriented to allow the egress of fluid from the housing and therefore from the tank. Preferably, said at least one one-way valve is an umbrella valve. Preferably, the cracking pressure, the pressure at which the valve allows the egress of fluid, of the or each one-way valve is tuneable.

Preferably, the housing comprises a first portion and a second portion. Preferably, the first and second portion are attachable and detachable. Preferably, the first and second portion attach via a fluid-tight attachment. Preferably, the first and second portion attach via a screw thread. Preferably, the attachment of the first and second portion comprises O-rings.

Preferably, the first portion substantially contains said plurality of baffles, and said second portion comprises a flange for attachment of said housing to a flexible tank. Preferably, the second portion comprises an array of apertures substantially perpendicular to said opening.

Preferably, said fluid is a gas.

In accordance with a second aspect of the present invention there is provided a flexible tank comprising any vent described above, wherein said vent is in fluid communication with the interior of said flexible tank. Preferably, the vent is in fluid communication with the interior and exterior of the flexible tank. Preferably, the vent is orientated on a top surface of the flexible tank.

In accordance with a third aspect of the present invention there is provided a kit of parts comprising the vent described above and a flexible tank.

DETAILED DESCRIPTION

Embodiments of the present invention will now be described by way of example only and with reference to the accompanying drawings, in which.

Figure 1:
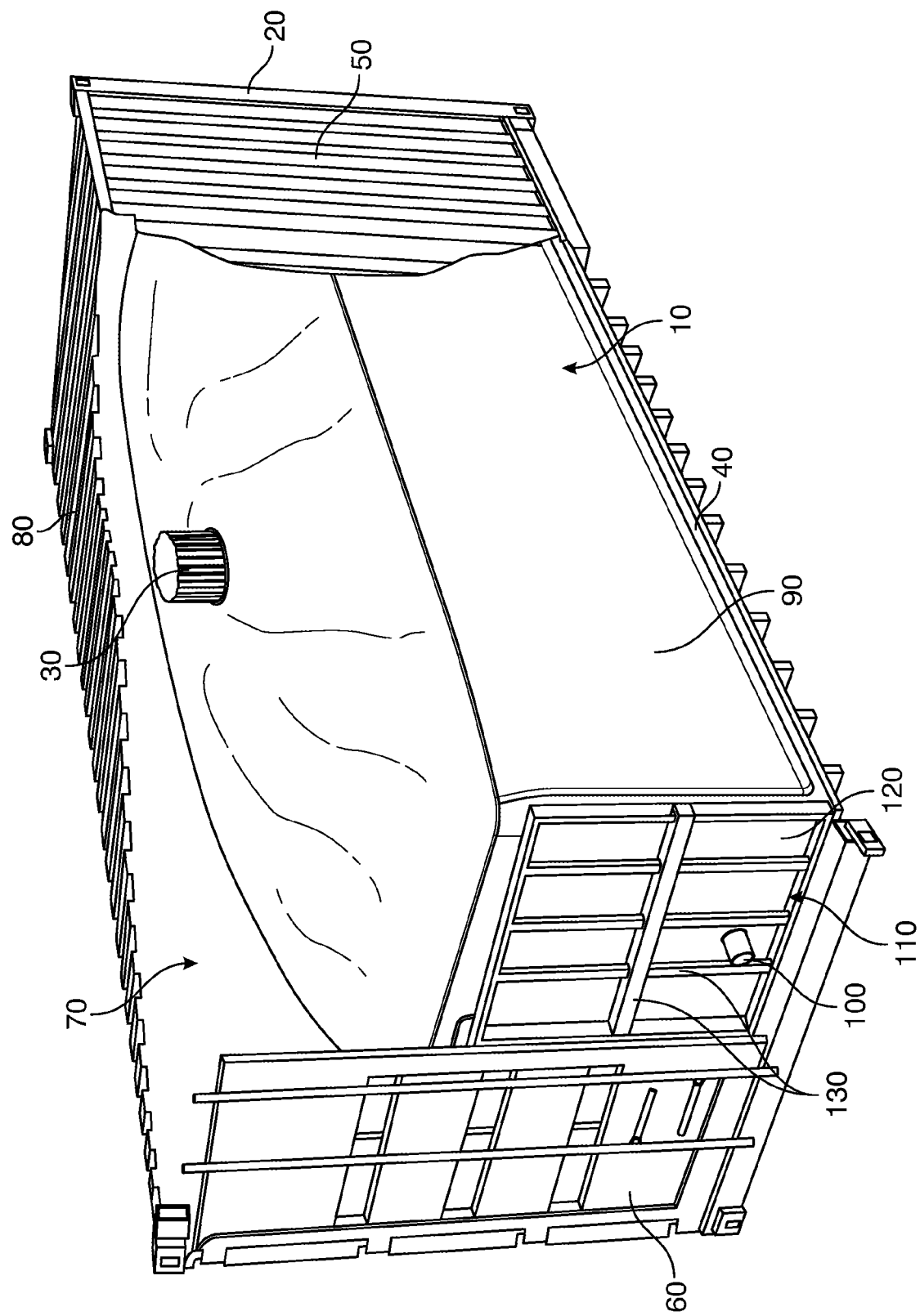
FIG. 1 is a schematic isometric view of an embodiment of a vent in accordance with the present invention attached to a flexible tank within a transportation container.

Referring to FIG. 1 of the drawings, there is depicted a fluid-filled flexible tank 10 within a transportation container 20 which comprises a vent 30, the vent 30 in accordance with a first embodiment of the present invention. The flexible tank 10 is supported by the floor 40, walls 50 and doors 60 of the transportation container. The space and volume above the flexible tank 10 and below the ceiling 80 of the container 20 is known as the headspace 70. The flexible tank's headspace 70 typically exists in all shipments as there are weight limits for transportation for certain sized items. Normally, a flexible tank 10 is filled with fluids such that it occupies up to 80% of the transportation container's 20 volume. Leaving at least 20% of the transportation container's 20 volume as headspace 70.

The flexible tank 10 comprises an liner 90 which encompasses the internal volume of the flexible tank 10. The flexible tank 10 is filled and discharged with fluids via an inlet/outlet valve 100, which is attached to an opening in the flexible tank by an air-tight seal. The inlet/outlet valve 100 traverses the bulkhead assembly and is located proximal to the door 60 of a transportation container 20. The bulkhead assembly 110 comprises a generally planar backing panel 120, strengthening member supports 130, that extend across the length and width of the bulkhead assembly 110, and an opening, which enables the attachment of the inlet/outlet valve 100 to the flexible tank 10.

The vent 30 traverses the liner 90 of the flexible tank, through a specially made opening, and is normally located on the upper surface of the flexible tank 10. Portions of the vent 30 are located outside the tank, inside the tank and adjoined to the walls of the flexible tank. The vent 30 is attached permanently to the flexible tank by a weld.

The vent 30 is located on the upper surface of the flexible tank 10 as this helps to ensure that the vent 30 egresses, emits or ejects as little fluid as possible, and preferably only gases, during transportation. Additionally, the vent must prevent contaminants, moisture and air from entering the flexible tank 10.

Figure 2:
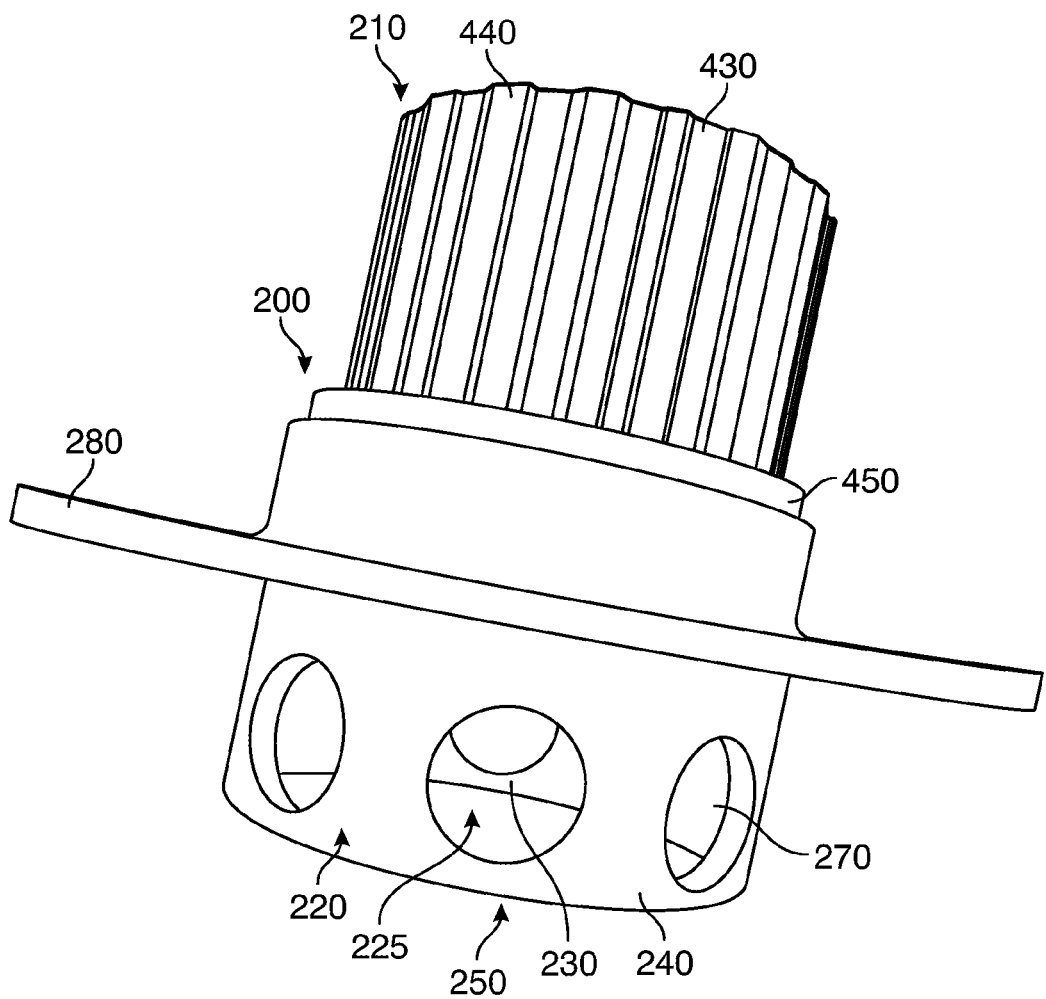
FIG. 2 is a schematic side-on view of an embodiment of a vent in accordance with the present invention.

The vent 30 itself will now be described by referring to FIG. 2 of the drawings, where FIG. 2 depicts an embodiment of a vent 30 for use with a flexible tank 10 in accordance with the present invention. The vent comprises a housing 200: the housing 200 comprising a first portion 210 and a second portion 220. The second portion 220, in use, traverses all layers of the flexible tank 10. Therefore, parts of the second portion 220 are located both internally and externally with respect to the flexible tank volume. In contrast, the second portion 210 is located in the headspace 70 and is external with respect to the flexible tank 10.

The second portion 220 comprises a hollow substantially cylindrical shape, where the cylinder comprises substantially circular bases and substantially straight and parallel walls 255, which have smooth inside 230 and outside 240 surfaces.

Additionally, the second portion 220 has a generally cylindrical channel 225 extending along its entire height, and as such has two generally circular openings of approximately similar size, one bottom opening 250 and one top opening 260 that are located on either of the cylinder's base surfaces. The second portion's 220 bottom opening 250 is a substantially similar size to the first portion 220 and, as such, the first portion 220 can be inserted into the bottom opening 250.

Located proximal to the bottom opening 250 and located in the walls 255 are an array of apertures 270: there are eight apertures 270 in the array. The apertures are substantially circular and evenly spaced around the walls 255. Additionally their centre points are aligned so that they form a single continuous row with an eight-fold axis of rotational symmetry. The aperture 270 have a constant diameter as they extend through the walls 255 and into the channel 225.

The second portion 220 comprises a welding flange 280 which protrudes from the outside curved surface 240 of the walls 255 in a direction substantially perpendicular to the rotational axis of the second portion 220 at approximately the mid-point of second portion's 220 height. The welding flange 280 is substantially circular, where its radius is approximately 1.5 times larger than the radius of the second portion 220. The plane occupied by the welding flange 280, and its flat surfaces, is substantially parallel to the planes occupied by the top 260 and bottom 250 openings. The height of the welding flange's 280 curved outer walls 270 is approximately the same as the thickness of the second portion's walls 255.

A role of the welding flange 280 is to offer a region where the vent 30 and the flexible tank 10 can be attached together permanently by a weld to form a fluid and air-tight connection. Therefore, the other shapes, designs and sizes of welding flange 280 are envisaged.

The second portion 220 is now described with reference to FIG. 3 of the drawings. The top opening 260 comprises a smaller diameter than the bottom opening 250, by an approximate reduction of its radius by 5%, as the thickened walls 290 of the second portion 220 proximal to the top opening 260 are thicker than the rest of the walls 255. The additional thickness of the thickened walls 290, compared to the walls 255, is added internally and protrudes into the channel 225, and as such the outer surface 240 of the second house piece 220 remains substantially straight. The thickened walls 290 extend around the entire circumference of the second portion 220 and the thickened walls 290 extend from the top edge of the top opening 260 towards the bottom opening 250 along approximately 20% of the channel's 225 length.

The bottom edge of the thickened walls 290 is adjacent to a recess 300. The recess 300 has three substantially straight sides, which comprises two substantially parallel sides and a substantially perpendicular base. The base is substantially aligned with the walls 255 and extends approximately 5% of the second portion's length 220 towards an internal female screw thread 310. The internal screw thread 310 protrudes out of the inner surface 230 of second piece housing 220 into the channel 225 where it comprises approximately 25% of the second portion's 220 inner surface 230 and finishes proximal to the top edge of the apertures 270.

Figure 3:
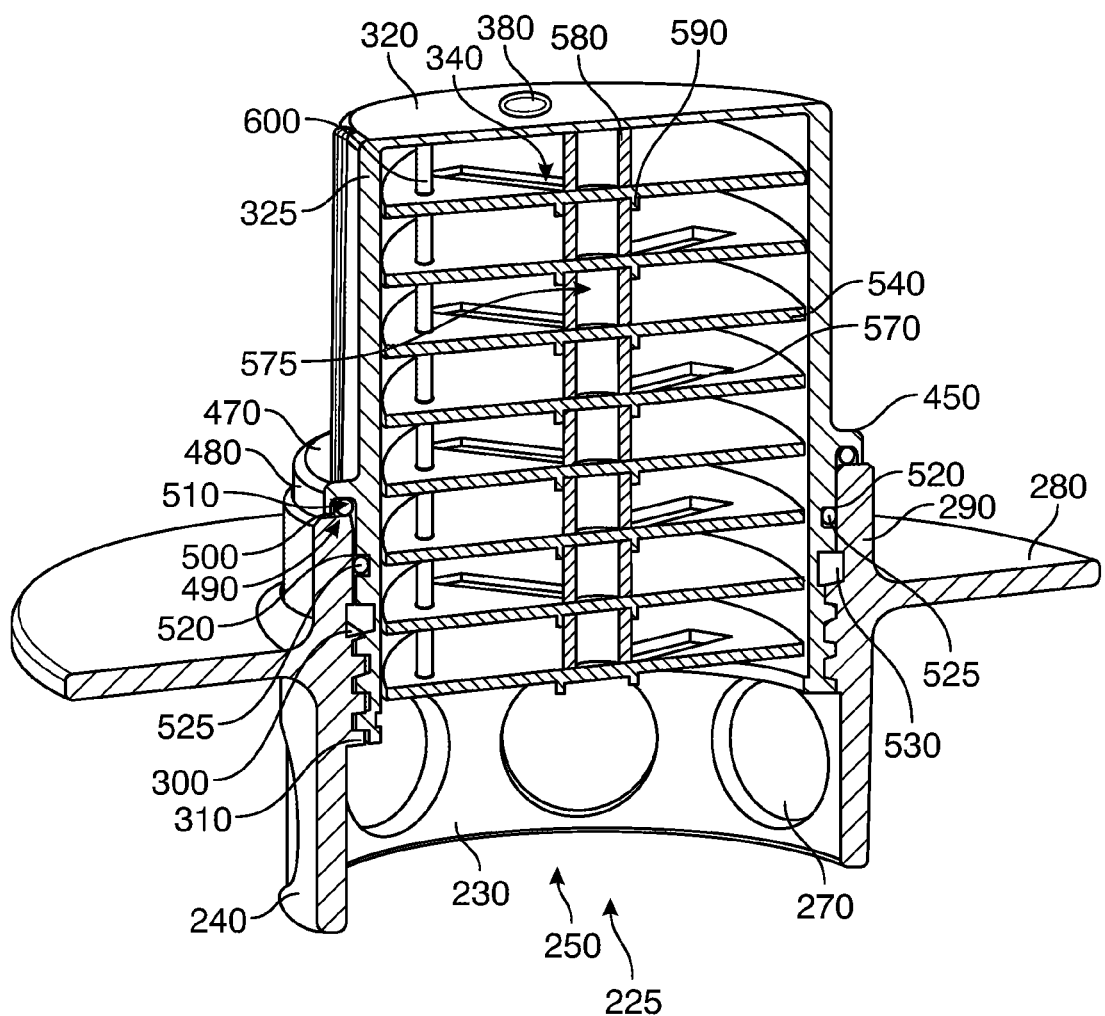
FIG. 3 is a schematic sectional view of an embodiment of a vent in accordance with the present invention.
Figure 4A:
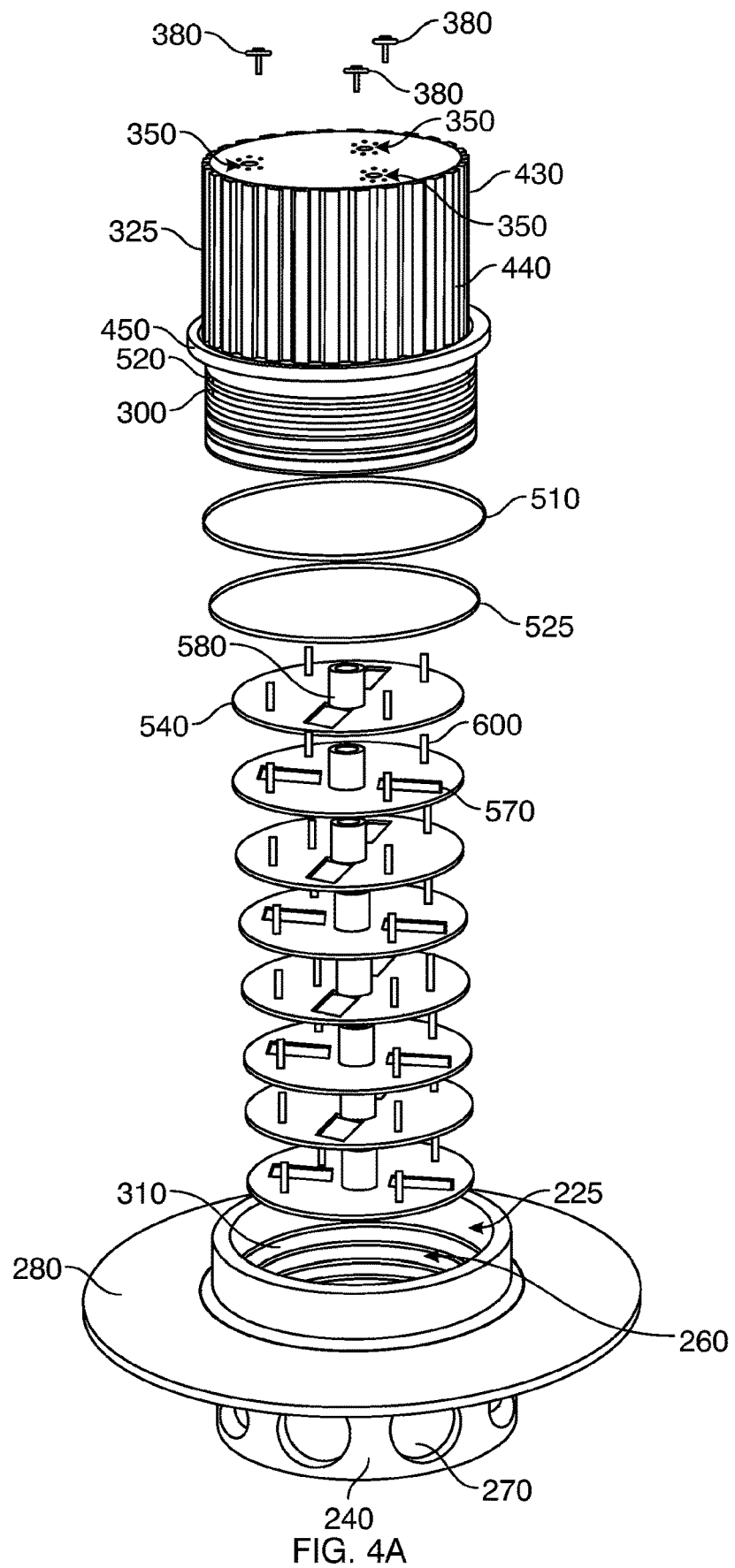
FIG. 4a is a schematic exploded view of an embodiment of a vent in accordance with the present invention.
Figure 4B:
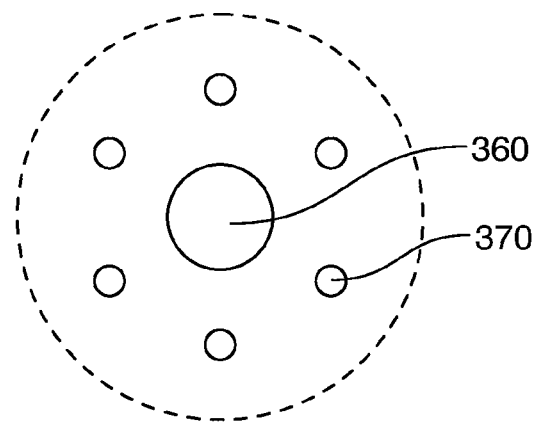
FIG. 4b is a schematic top-down view of an array of apertures for an umbrella valve.
Figure 4C:
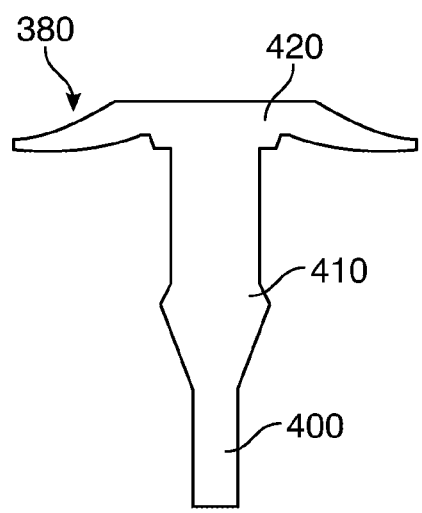
FIG. 4c is a side-on view of an umbrella valve.
Figure 5:
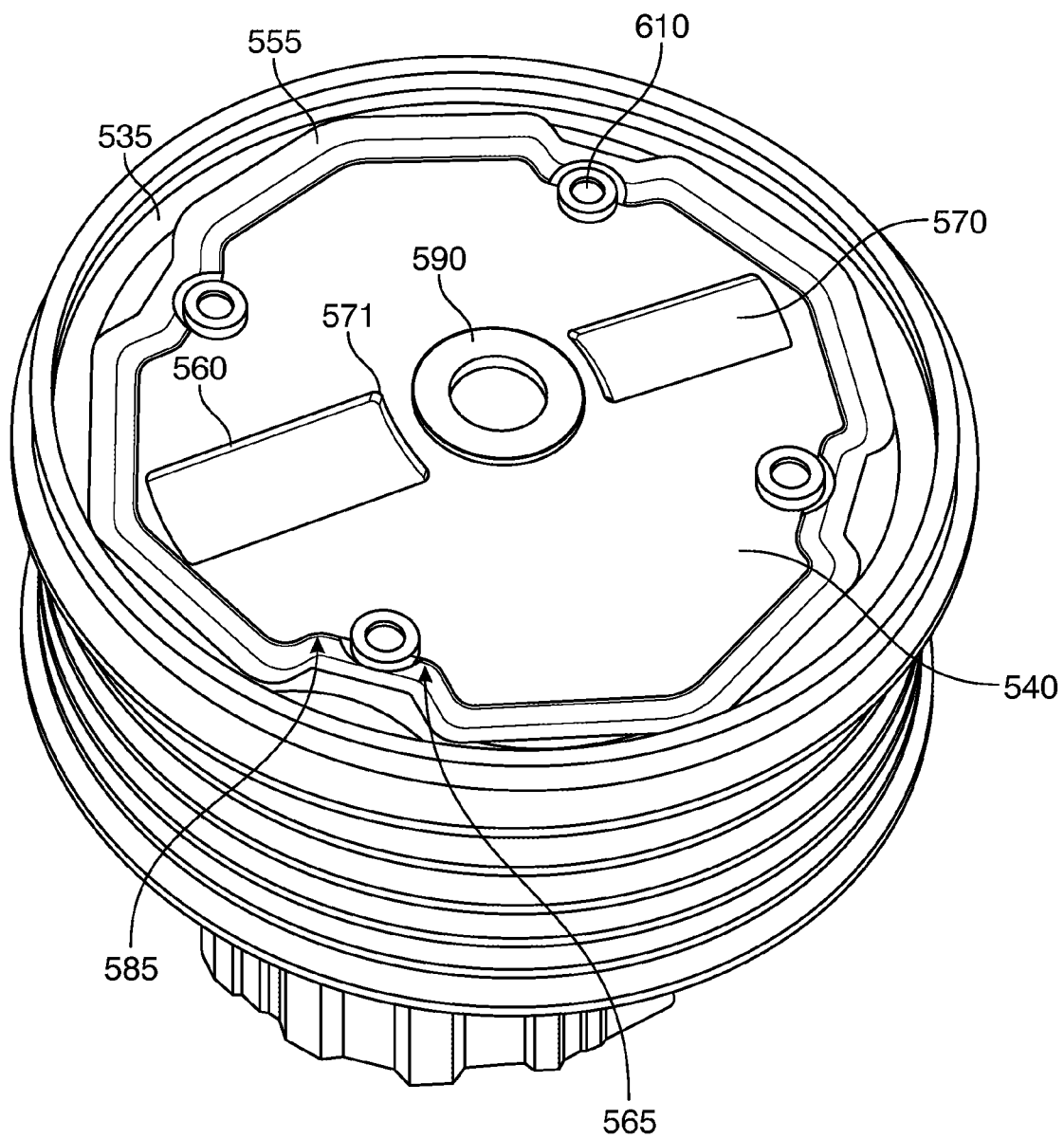
FIG. 5 is an isometric view of some of the underside of the housing within which the baffles are contained.

The first portion 210 of the housing 200 is described by referring to FIGS. 2, 3 and 4. The first portion 210 is generally cylindrical in shape. The radius of the first portion 210 is smaller than that of the second portion 220 and can be seen as complementary. One base of the first portion 210 is a solid base 320, whilst the other base comprises an aperture 330 that comprises the majority of the surface of the base. The base aperture 330 is the entrance to the channel 340 which extends along approximately over 95% of the first portion's 220 height, and which ends at the solid base 320. The channel 340 has a substantially circular cross-section, which is constant in size and shape along the length of the channel 340. Overall, the first portion 210 a generally 'cup-like' structure.

The solid base 320 of the first portion 210 is substantially flat and comprises three aperture arrays 350. The aperture arrays 350 extend through the solid base 320 and into the channel 340 of the first portion 210. The three aperture arrays 350 are located at the corners of an imagined equilateral triangle, where the sides of the equilateral triangles side are longer than the radius of the solid base 320 and the centre points of the imagined equilateral triangle and the solid base 320 are the coaxially aligned. As such, the solid base 320 comprises a three-fold axis of rotational symmetry.

Each of the aperture arrays 350 comprises a central substantially circular and cylindrical aperture 360, which has an associated umbrella valve 380. The central aperture 360 of the array 350 is surrounded by six peripheral apertures 370, the peripheral apertures 370 are substantially circular and cylindrical, and are located at the corners of an imagined regular hexagon, where the hexagon's and the central aperture's 360 centres are coaxially aligned. As such, the aperture arrays comprise a six-fold axis of rotational symmetry.

Umbrella valves 380 are elastomeric valves that are typically one-way valves. The body 400 of the umbrella valve 380 is inserted into the central aperture 360 and the retaining portion 410 of the body secures the valve in place. The head 420 of the valve 380 is proximal to the peripheral apertures 370 and covers them in an airtight seal between the valve 380 and the solid base 320. In use, when the pressure inside the channel 340 (and therefore the flexible tank 10) increases the head 420 will elastically deform and break the airtight seal. The excess pressure is then ejected into the environment, or more specifically the headspace, relieving the internal pressure in the channel 340 and flexible tank 10. Immediately after the egress of excess pressure the head 420 of the valve elastically reforms the airtight seal protecting the flexible tank's 10 contents from contaminants and the environment. During normal operation, the elastic nature of the umbrella valve 380 ensures that valve 380 is reseated and resealed perfectly every time.

The edge of the solid base 320 is perpendicular to the walls 325 of the first portion 210 are joined by a rounded corner. Additionally, the circumference of the solid base 320 and the first portion 210 comprise outwardly curved portions 430. Each outwardly curved portion 430 is substantially identical and is a section of a circle, where the section has an area one-third of a circle. The radius of the outwardly curved portion 430 is at least an order of magnitude smaller than the radius of the solid base 320 and first portion 220. There are sixteen outwardly curved portions 430 which are evenly spaced around the circumference of the first portion 220, with the first portion's cylinder curved walls 440 acting as a spacer. The outwardly curved portions 430 and their separating curved walls 440 extend along approximately 50% of the first portion's 220 height, from the solid base 320 to the first portion's brim 450. Overall, the majority of the circumference in-between the brim 450 and the solid base 320 comprises outwardly curved portions 430.

The brim 450 is joined to the outwardly curved portions 430 and the curved walls 440 via a rounded edge. The brim 450 protrudes from the first portion substantially perpendicular to the walls 325 of the first portion 210 and therefore is there substantially parallel to solid base 320. The brim 450 is substantially circular and has a radius larger than the solid base 320, yet a radius smaller than the second portion 220. The brim 450 has an upper surface 470, outer walls 480 and a lower surface 490. The upper surface of the brim 470 is substantially circular and extends from the walls 325 to a rounded right-angle corner at its circumference. The brim's 450 height and the height of the outer walls 480 is approximately the same as the thickness of the walls 325. The brim's wall 480 is substantially parallel to the walls 325 and comprises a rounded right angle to the upper surface 480 and a right angle to the lower surface 490.

The brim's lower surface 490 comprises a recess 500 and an O-ring 510, which is inserted into the recess 500. The brim 450, therefore, comprises continuous loops of the recess 500 and the O-ring 510 which circumnavigate the first portion 210. The recess 500 comprises two sides which are substantially parallel to the walls 325 sides and a side which is substantially perpendicular to the walls 325. Additionally, when the first 210 and second portions 220 are attached the O-ring 510 and recess 500 are located adjacent and above the top edge 515 of the second portion 220. The diameter of the O-ring 510 is larger than the depth of the recess 500. As such, when the first 210 and second portions 220 are attached the O-ring 510 is compressed creating an airtight seal.

The walls 325 then extend from the lower surface of the brim 490, and the recess 500, such that the walls 325 are substantially parallel and aligned with the walls 440 above the brim. When attached together the housing comprises flush contact between the first 210 and second 220 portions wall's, in particular between the thickened walls 290 and the walls 325. The walls 325 extend for approximately 5% of the first portion's height to a second continuous loop recess 520 and O-ring 525 seal. When the first 210 and second 220 portions are attached the second seal comprises an O-ring being compressed against the thickened walls 290. The sides of the recess 520 are either parallel or perpendicular to the longitudinal axis of the first portion 210.

The walls 325 of the first portion 210 then extend from the recess 520 to another recess 535, which is substantially similar to the recess 300. Together the recesses 535 and 300 form a cavity 530 in between the first 210 and second 220 portions. The cavity 530 is a continuous loop and is adjacent to an external male screw thread 545. The housing, therefore, comprises the first 210 and second portion's 220 attached by the complementary screw threads 310 and 545.

In the channel 340 and proximal to the base aperture 330 the inner surface of the comprises first portion comprises a recess 535. The recess 535 has a substantially rectangular cross-section and extends along the entire circumference of the inner wall of first portion 210 substantially parallel to solid base 320. The recess 535 comprises a complementary retaining ring 555.

The retaining ring 555 comprises a generally circular flattened torus. The retaining ring's 555 circumference and height are approximately similar, and complementary, to that of the recess 535 inside the walls of the first portion. Therefore, the retaining ring 555 can be inserted into the recess 535. The outer edge of the retaining ring 555 has four inwardly curved portions 565, and on the inside edge these four inwardly curved portions 555 there are four outwardly curved portions 565. The outwardly curved portions 565 are designed, sized and positioned to be complementary to peripheral retaining member's 610, which are detailed later.

The housing 200, and particularly the first portion 210, comprises a convoluted pathway. The convoluted pathway comprises a plurality of baffles 540, and the baffle's apertures 570, in a series 575, where the apertures 570 in the series 575 are offset from the apertures 570 of adjacent baffles 570. The convoluted pathway extends from the base aperture 330, through the first portion's channel 340, to the underside of the solid base 320 and the umbrella valves 380.

Each baffle 540 comprises a substantially circular disk. The baffle 540 disk has a radius approximately identical to the first portion's channel 340, such that the baffle 540 fits flush into the channel 340. The baffle 540 has two generally rectangular apertures 550. The apertures 550 comprise four sides, two straight longer sides 560 and two curved shorter sides 571. The two curved shorter sides 571 comprise a degree of curvature similar to that of the baffle, thus, if tangents were drawn at equivalent points on either the curved shorter sides 571 or the baffle's 540 circumference the tangents would be substantially parallel. For each aperture 550 the midpoints of the two curved sides 571 are aligned and fall on a single radial line, in other words, the curved shorter sides 571 are orientated such that they can be dissected into two equal halves by a single radial line. The straight sides 560 of each aperture align parallel to these radial lines. Furthermore, the apertures are orientated 180° apart and comprise a two-fold axis of rotational symmetry and a plane of symmetry.

The two flat surfaces of the baffle 540 comprise different features: one surface comprises locating members 580, 600, defined as the upper surface, and one surface comprises the complementary with retaining members 590, 610, defined as the lower surface. A series of baffles 575, therefore, comprises individual baffles 540 attached and held in a linear series by their locating 580, 600 and retaining members 590,610 forming attachments.

More precisely, each baffle 540 has central locating member 580 and four peripheral locating members 600 on its surface. The central locating member 580 is a substantially hollow and cylindrical tube, which has a substantially circular cross-section, a radius of approximately 5-15% that of the baffle 540 and is coaxially aligned with the baffle. The central locating member 580 has a height approximately 10% of the channel 340 such that eight baffles can be housed within the first portion 210.

The central locating member 580 has a complementary retaining member 590 on the lower surface of the baffle 540, which is a hollow cylindrical tube which is located centrally on the baffle's 540 flat surfaces but whose height is approximately 20% the height of the central locating member. The central retaining member 590 has a radius larger than the central locating member by approximately the width of the central retaining member's 590 walls and the centres of the central locating 580 and retaining 590 members are coaxially aligned. The central locating member can dock into the retaining member to form an attachment.

Thus, a series of baffles 575 may comprise a daisy-chain of baffles 540 attached by the central retaining member 590 docking with the central locating member 580. In the series of baffles, if each baffle 540 defines a plane then all the planes in the series of baffles would be substantially parallel. As such, the number of baffles in the series of baffles can be varied by either attaching or detaching baffles to the series using the docking attachment mechanism between the two central members 580, 590.

Additionally, located on the upper surface of the baffle 540 are four peripheral locating members 600, which are located on the corners of an imagined square, where the square is coaxially aligned with the baffle. Thus, the peripheral locating members 600 have a four-fold axis of rotational symmetry. Each of the four peripheral locating members 600 is cylindrical in shape, with a substantially circular cross-section, has a height which is approximately similar to that of a central locating member 580.

The peripheral locating members 600 have a set of complementary and coaxially aligned peripheral retaining members 610. Similar to the central docking attachment mechanism described above, the peripheral retaining members 610 radius is larger than that of peripheral locating member 600 by approximately the width of the peripheral retaining members 610 walls, the peripheral retaining members 610 are only approximately 20% the height of the locating members 600 and the centres of the different members are aligned. Thus, all four peripheral locating members 600 can be inserted into all four peripheral retaining members simultaneously and the baffle's 540 in the series of baffles cannot be rotated with respect to one another. The inability of the baffles to rotate is advantageous as it maintains the off-set nature of the apertures 550.

The convoluted pathway is comprised of a series of baffles 575 which are located inside the housing 200 of the vent, and in-between the openings which are located inside the flexible tank 250,270 and the underside of the valves 380. In this embodiment of the invention, the series of baffles 575 is linear and consists of eight identical baffles 540. An example of a convoluted pathway for this embodiment is depicted in FIG. 3.

The baffles 540 comprise a series 575 as they are attached using the locating 580,600 and retaining members 590,610. The baffles 540 are identical, however, in the series 575, their orientation is rotated with respect to the baffles 540 adjacent to them. This offsets apertures 550 from one baffle 540 to another and stops a straight pathway from the bottom openings 250,270 to the valve 380 from forming. The rotational offset between adjacent apertures is 90° as the peripheral retaining members 610 have a four-fold axis of symmetry. The 90° off-set locates the longitudinal axis of the apertures 550 perpendicular to the longitudinal axis of the apertures 550 of adjacent baffles 540. Additionally, the off-set nature of the apertures 550 means that adjacent baffles 550 have none of their aperture area aligned or overlapping with the apertures 550 of adjacent baffles. In this embodiment of the invention, baffle's 540 are rotated 90° and have two apertures, however other embodiments of the invention have been envisaged, such as changing the number size and shape of the aperture and varying the angle of rotational offset. Overall, the convoluted pathway necessitates the fluid contents of the flexible tanks to change its directional vector multiple times to traverse the length of the vent 30, from the bottom openings 250, 270 to the valve 380.

The housing 200, and particularly the first portion 210, comprises a convoluted pathway. The convoluted pathway comprises a plurality of baffles 540 and apertures 370 in series 575, where the apertures 370 in the series 575 are offset from the apertures 370 of adjacent baffles 370. The convoluted pathway extends from the base aperture 330, through the first portion's channel 340, to the underside of the solid base 320 and the umbrella valves 380.

The retaining ring 555 can be used to help secure the series of baffles 575 inside the housing 200, and more specifically the first portion 210, by partially inserting the ring 555 into the recess 535 and attaching the outwardly curved portions 565 to all four of the peripheral retaining members 610. The attachment also prevents the rotation of the baffle series 575 with respect to the retaining ring 555.

The series of baffles 575 size and shape is complementary to the size and shape of the channel 340, as such, the space between the baffles 540 and the inner walls of the first portion 210. Thus, once a fluid enters the channel it must traverse the convoluted pathway to reach the valves 380.

The convoluted pathway formed by in the series of baffles 575 prevents fluids from moving from the main bulk of the flexible tank 10 to the valves 380 of the vent 30 unimpeded. However, the series of baffles 575 impedes the flow of gas much less than it impedes the flow of fluid. For example, a single splash of fluid travelling along the longitudinal axis of the vent 30 cannot reach the valves 380 directly. As such, the contact of the fluid with the valves should be significantly reduced by the convoluted pathway and series of baffles 575. This reduces the pressure of fluid impacts and reduces the likelihood that the valves 380 will acquiesce and open during a splash and egress fluid. Furthermore, the convoluted pathway and its baffles 540 prevent continuous splashing events inside the tank's contents from contacting the umbrella valve, which is advantageous as continuous splashing can lead to residue depositing on the valve and internal surfaces of the vent, which can lead to the valve not resealing and reseating properly.

The pressure at which the umbrella valves egress (cracking pressure) can be tuned by, but not limited to, the material of umbrella valve, the size of umbrella valve, the size of the peripheral apertures 370, the number of umbrella valves and their location on the housing. This egress pressure can be tuned so that the vent egresses gas before the structural integrity of the flexible tank 10 or transportation container 1 is challenged. The egress pressure can be tuned for different fluids, at different parts of the fluids transportation cycle, different weathers, amongst other reasons. Furthermore, the egress of gas and the limiting of the internal build-up of pressure is done automatically by the vent 30 without requiring human input. As such, the vent 30 may be classified as automatic.

The vent 30 is located on the top surface of the flexible tank 10 to reduce contact with the fluid held inside the flexible tank. Placing the vent 30 at the highest point of the flexible tank 10 helps ensure that the vent 30 is predominantly exposed any gas present inside of the flexible tank 10. Additionally, the cylindrical shape of the housing 200 spatially separates and increases the distance between the valves 380 and the contents of the flexible tank 10. This spatial separation reduces the chance of fluid contacting the valve.

The housing 200 comprising two parts 210, 220 attached via a screw attachment ensures the two portion's 210, 220 can be detached and the inside and baffles cleaned. Additionally, this allows the event to be opened quickly in the event of an emergency. The inclusion of the recess 500, 520 and O-ring 510, 525 seals in the housing 200 is advantageous as they form airtight and fluid-tight seals. This makes the screw attachment airtight and fluid-tight which prevents contaminants and air from outside entering the tank, and prevents the tanks contents from leaking out of the vent.

Various alterations and variations of the disclosed embodiments are envisaged. More specifically, amongst other variations, it is envisaged that any feature disclosed in relation to one or more baffles may be present on any number of baffles in the vent. Additionally, any feature described herein may be present in both singular and multiple form in vents within the scope of the present disclosure.

The invention claimed is:

1. A vent for the egress of fluid, wherein said vent comprises a housing, said housing comprising an opening and at least one valve that extends through the housing, and a plurality of baffles within the housing, wherein each baffle in the plurality of baffles comprises at least one aperture, and wherein the aperture or apertures of a first baffle within the plurality of baffles are offset from the aperture or apertures of a second baffle within the plurality of baffles, wherein at least one baffle comprises at least one locating member for positioning said baffle relative to an adjacent baffle and wherein said adjacent baffle comprises at least one retaining member for receiving and removably retaining said locating member, the at least one retaining member extending outward from a surface of the adjacent baffle, wherein said at least one baffle is attachable to, and detachable from, said adjacent baffle via said at least one locating member and said at least one retaining member.

2. The vent of claim 1, wherein each baffle in the plurality of baffles is arranged such that their aperture or apertures are offset with the aperture or apertures of the adjacent baffles.

3. The vent of claim 1, wherein at least one aperture in at least one baffle of the plurality of baffles is completely obscured by an adjacent baffle.

4. The vent of claim 1, wherein each baffle in the plurality of baffles is positioned such that its aperture or at least one of its apertures is completely obscured by an adjacent baffle.

5. The vent of claim 1, wherein the apertures are positioned to define a convoluted pathway.

6. The vent of claim 1, wherein said apertures are rotationally offset.

7. The vent of claim 1, wherein the apertures define a pathway through said housing to said at least one valve.

8. The vent of claim 1, wherein said baffles are substantially planar.

9. The vent of claim 1, wherein at least two baffles in said plurality of baffles are substantially parallel.

10. The vent of claim 1, wherein said at least one valve is a one-way valve oriented to allow the egress of fluid from the housing.

11. The vent of claim 10, wherein said at least one one-way valve is an umbrella valve.

12. The vent of claim 1, wherein the housing comprises a first portion and a second portion.

13. The vent of claim 12, wherein the first portion contains said plurality of baffles, and said second portion comprises a flange for attachment of said housing to a flexible tank.

14. The vent of claim 12, wherein the second portion comprises an array of apertures substantially perpendicular to said opening.

15. The vent of claim 1, wherein said fluid is a gas.

16. A flexible tank comprising the vent of claim 1, wherein said vent is in fluid communication with the interior and exterior of said flexible tank.

17. A kit of parts comprising the vent of claim 1, and a flexible tank.

18. The vent of claim 1, wherein said at least one locating member is spaced apart from an outer edge of said at least one baffle.

* * * * *